US007096493B1

(12) United States Patent
Liu

(10) Patent No.: US 7,096,493 B1
(45) Date of Patent: Aug. 22, 2006

(54) INTERNET FILE SAFETY INFORMATION CENTER

(75) Inventor: Gary G. Liu, 3320 Leighton Ridge Dr., Plano, TX (US) 75025

(73) Assignee: Gary G. Liu, Plano, TX (US)

( * ) Notice: Subject to any disclaimer, the term of this patent is extended or adjusted under 35 U.S.C. 154(b) by 855 days.

(21) Appl. No.: 09/747,763

(22) Filed: Dec. 21, 2000

(51) Int. Cl.
*G06F 17/00* (2006.01)
(52) U.S. Cl. .................. 726/8; 726/4; 726/5
(58) Field of Classification Search ........... 713/200, 713/201, 155, 156; 726/4, 5, 8
See application file for complete search history.

(56) References Cited

U.S. PATENT DOCUMENTS

| | | | | |
|---|---|---|---|---|
| 5,757,915 | A | * | 5/1998 | Aucsmith et al. ........... 713/187 |
| 6,154,747 | A | * | 11/2000 | Hunt ........................... 707/100 |
| 6,225,995 | B1 | * | 5/2001 | Jacobs et al. ................ 715/738 |
| 6,226,618 | B1 | * | 5/2001 | Downs et al. .................. 705/1 |
| 6,233,565 | B1 | * | 5/2001 | Lewis et al. .................. 705/35 |
| 6,742,028 | B1 | * | 5/2004 | Wang et al. ................. 709/223 |

OTHER PUBLICATIONS

A software infrastructure for authenticated Web metering; Blundo, C.; Cimato, S.; Computer vol. 37, Issue 4, Apr. 2004 pp. 28-33.*
IPSec overhead in wireline and wireless networks for Web and email applications; Hadjichristofl et al.; Performance, Computing, and Communications Conference, 2003. Proceedings of the IEEE International Apr. 9-11, 2003 pp. 543-547.*
Data Security Implementation for Real Time Internet Packet Traces; Anantha Narasimhan, S. et al.; INDICON, 2005 Annual IEEE Dec. 11-13, 2005 pp. 561-564.*

* cited by examiner

*Primary Examiner*—David Jung
(74) *Attorney, Agent, or Firm*—Fish & Richardson P.C.

(57) ABSTRACT

Systems and methods to enhance safety of computer file distribution. The system includes a computer network, a server computer connected to said computer network one or more electronic records stored in the server computer wherein each record includes information about a particular file and is indexed by a hash value computed from the particular file and at least one user terminal connected to the computer network. The user terminal is operable to verify the authenticity of a particular file including computing the hash value of the particular file and retrieving from the server computer the electronic record that contains information about the particular file including submitting the computed hash to the server computer.

16 Claims, 3 Drawing Sheets

Example A: An authentic file

```
           Internet File Safety Information Center
File Name: ZixMailSetupexe      Author: Zixit Corporation File Hash: 0123456789ABCDEF0123456789ABCDEF The authenticity of this file has been verified by comparing with an
authentic file directly obtained from the author.

Test Result:  No virus discovered. No malicious behavior detected.

20,237,393 users have looked up information about this file. None
have reported any malicious behavior.
```

Example B: An unknown file

```
          Internet File Safety Information Center
File Hash: ABCDEF0123456789ABCDEF0123456789

No other information available 10 users have looked up the information about this file. None have
reported any malicious behavior.

We cannot determine whether the file is authentic. Please be
cautious when using this file.
```

Example C: A file known to be malicious

```
          Internet File Safety Information Center
File Hash: DEF0123456789ABC0123456789ABCABCDEF WARNING!!! This file is a dangerous Trojan horse. It will wipe out
your hard drive.  DO NOT RUN IT!

23,789 users have looked up information about this file. 5 users
have reported extremely dangerous behavior.  Our lab test
has confirmed such a behavior.  For more information click:

http://www.filesafetycenter.com/malicious/PKZ300TROJ.html
```

Fig. 2

INTERNET FILE SAFETY INFORMATION CENTER

FIELD OF THE INVENTION

This invention relates generally to computer security and more particularly to a system and method to enhance the safety of files distributed over the Internet or other distribution channels.

BACKGROUND OF THE INVENTION

In a public computing network, such as the Internet, any user can distribute files. Unfortunately, this means that malicious persons can distribute fake versions or virus infected versions of legitimate popular software programs and other types of files. Several "Trojan horse" attacks have occurred in recent years to popular programs distributed over the Internet. In addition to the distribution using the Internet, there are also many ways a file can be distributed publicly, for example, using "Shareware" CDs (compact disks). In all these cases, there is a need for the end user to make sure that a file received through a public distribution channel is authentic and safe before using it.

File safety is conventionally provided in two ways. First, an individual user can utilize conventional anti-virus software to scan received files. This solution is reactionary, in that first a virus must be identifiable by the anti-virus software. Conventional anti-virus software programs provide little or no protection against new viruses. A virus has to first be discovered, then a considerable amount of research may be required to be performed to find ways to detect and destroy the virus. Finally, the solution has to be distributed to potentially millions of anti-virus software users. This is very inefficient.

Alternatively, a digital signature can be applied to a file to ensure file authenticity. The digital signature can be verified prior to using or accessing the file. This solution is also problematic. The creator of a file has to take actions to certify their public keys and sign the file to be distributed. Digital signature generation requires a considerable amount of work and cost, and as such few files distributed over the Internet are signed by their authors. Many useful files that are distributed publicly are not signed. A malicious person can attack these unsigned files. Another problem of this approach is that the files are not generally authenticated in the real time. That is, in general the file is authenticated one time by the creator. If some virus or other defects are discovered in the file after it is signed, the creator may not be able to communicate to all the users to avoid the signed file, especially when the file has already been burned into CDs and distributed publicly.

SUMMARY OF THE INVENTION

In one aspect, the invention provides a system to enhance safety of computer file distribution. The system includes a computer network, a server computer connected to said computer network, one or more electronic records stored in the server computer wherein each record contains information about a particular file and can be retrieved when a hash value computed from said particular file using a one-way hash function is presented to said server computer and at least one user terminal also coupled to the computer network. The user terminal is operable to compute the hash value of a file using said one-way hash function and then use this hash value to retrieve from the server computer the electronic record that contains information about the file.

In another aspect, the invention provides a system to enhance safety of computer file distribution. The system includes a computer network, a server computer connected to said computer network one or more electronic records stored in the server computer wherein each record includes information about a particular file and is indexed by a hash value computed from the particular file and at least one user terminal connected to the computer network. The user terminal is operable to verify the authenticity of a particular file including computing the hash value of the particular file and retrieving from the server computer the electronic record that contains information about the particular file including submitting the computed hash to the server computer.

Aspects of the invention can include one or more of the following features. The server computer can be operable to hash using a one-way hashing function the particular file and store the hash value in the associated record. The electronic records can include a signature produced by an authenticating agent associated with the particular file and wherein the step of retrieving the electronic record can include retrieving the signature. The authenticating agent can be the author of the particular file. The electronic records can include signature data produced when validating a signature associated with the particular file and wherein the step of retrieving the electronic record can include retrieving the signature data. The particular file can be a computer program or a data file.

In another aspect, the invention provides a system to enhance safety of computer file distribution over a computer network. The system can include a server computer connected to the computer network and accessible by computer network clients. The server computer includes one or more electronic records wherein each record includes information about a particular file and is indexed by a hash value computed from the particular file and means for responding to client requests that include a hash value. The means for responding is operable to retrieve an appropriate record associated with the particular file and forward the information to a requesting client computer.

In another aspect, the invention provides a system to enhance safety of computer file distribution over a computer network and includes at least one user terminal connected to the computer network. The user terminal is operable to verify the authenticity of a particular file including computing the hash value of the particular file and retrieving from a server computer an electronic record that contains information about the particular file including submitting the computed hash to the server computer. The user terminal can display the information to the user terminal operator.

In another aspect, the invention provides a method for enhancing safety of computer file distribution and includes storing one or more electronic records in a server computer wherein each record includes information about a particular file and is indexed by a hash value computed from the particular file. The method includes identifying a first file for authentication, computing the hash value of the first file and retrieving from the server computer the electronic record that contains information about the first file including submitting the computed hash to the server computer.

Aspects of the invention can include one or more of the following advantages. A system is provided for authenticating files distributed over a public computing system, such as the Internet. The system allows an end user to look up the authenticity and other information about a file according to a hash value computed from the file using a cryptographically-secure one way hash function. The authenticity of a file can be verified in real time.

The system is secure. A user having an authentic file will always compute the correct hash value and will see information related to the authentic file. On the other hand, a user with a modified or bogus version will always compute a different hash value and will see different information or no information. A user, having a file that is known to be malicious, can be presented with information that contains warnings about the malicious file.

By simply computing a hash value of a file and connecting to a server, a user can obtain authentication and other information about a file without having to verify or scan the file. File verification and scanning can be carried out in a central lab instead of by each user, allowing the verification and scanning process to be much more thorough and current. The file's integrity can be assured to be very secure when using these systematic checks. The information associated with the file can include a description of the authentication routines and procedures that were run against a given file, including many virus discovery tests that are simply not practical for each individual user to perform in his/her own PC. The tests may include scanning by the various commercial virus-scanning programs. The system also presents information related to the experience of the users all over the Internet. This will certainly ensure much higher safety level than a simple virus scan with the user's own computer. When a new virus or a "Trojan horse" is discovered in any file on the Internet or any other place, a warning sign can be immediately put into the information record corresponding to the hash of the infected file to warn the users to avoid that file. This is certainly much faster than letting millions of users update their anti-virus software.

The system offers advantages over the digital signature approach as well. The system does not require the file to be signed and does not require the signature of the author to be certified. The system can discover viruses that are accidentally signed into a file by its author.

These and other advantages will be apparent upon a review of the specification, the drawings and attached claims.

BRIEF DESCRIPTION OF THE DRAWINGS

FIG. 2 shows examples of the information stored for different file types in the system of FIG. 1a as displayed by a browser.

DETAILED DESCRIPTION

Figure 1A:
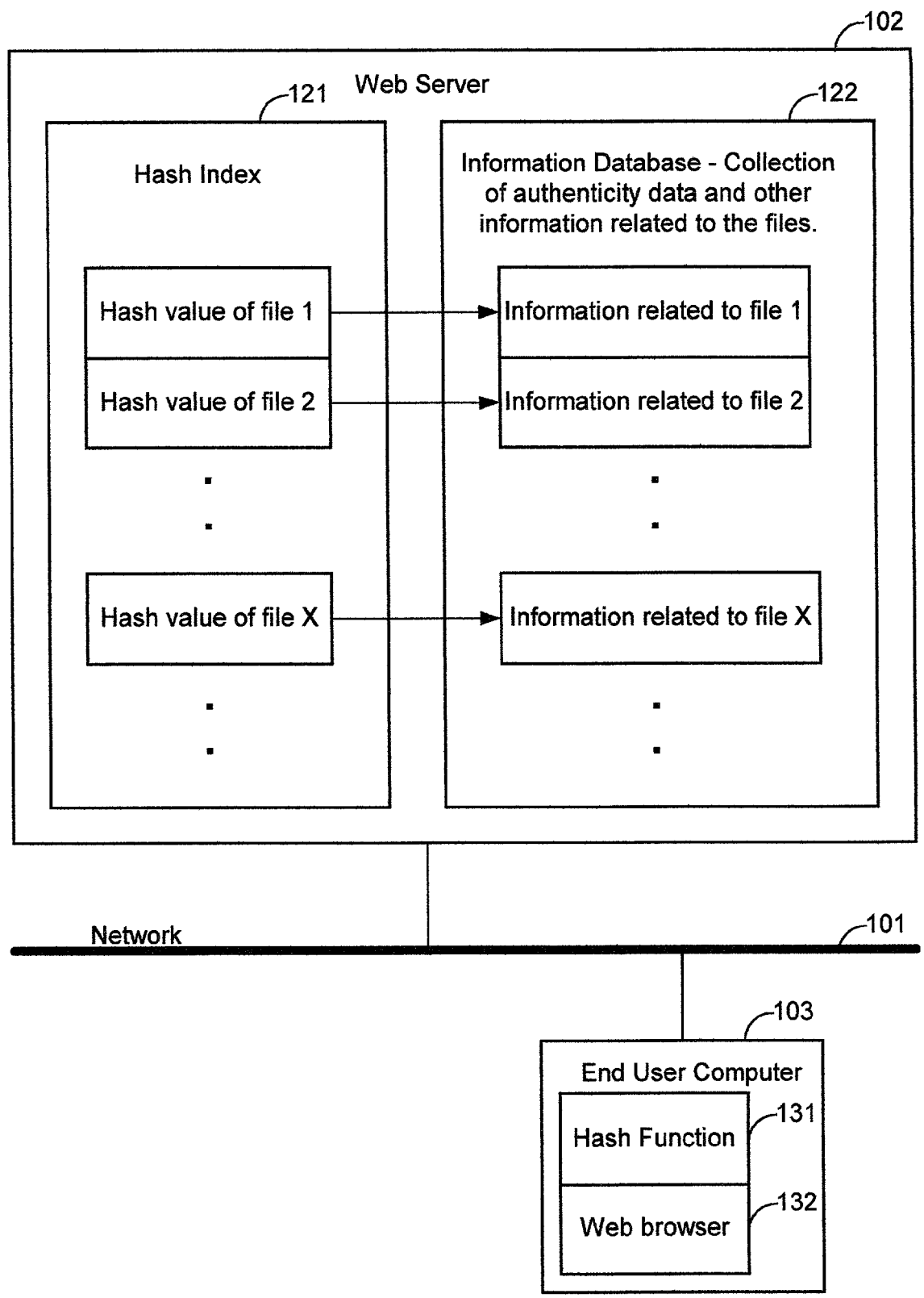
FIG. 1a shows a system for authenticating files distributed publicly.

FIG. 1 shows a system 100 for authenticating files distributed publicly. System 100 includes a web server 102 and at least one end user computer 103 coupled to a network 101, such as the Internet.

Web server 102 can be any type of server computer, which upon receiving an HTTP request, returns a web page (hyper text mark-up language (HTML) document) statically stored or dynamically generated. Web server 102 includes a hash index 121 and an information database 122. Information database 122 includes a collection of data records related to the authenticity and other information about the files. Hash index 121 includes a list of hash values of the files distributed over the network. The hash values are computed using cryptographically-secure hash functions, such as message digest MD5 or Secure Hash Algorithm (SHA). Each hash value in hash index 121 can be used as an index to retrieve from information database 122 the information related to the particular file that has the corresponding hash value. In other words, web server 102 can be used to allow retrieval of information about a file according to the hash of the file.

End user computer 103 is a computer connected to network 101. Each end user computer 103 includes a hash function 131 and a web browser 132. Hash function 131 is used to compute the hash of the files downloaded or obtained from other sources. End user computer 103 uses the same hash algorithm (hash function 131) that is used to compute the hash values stored in the hash index 121 of web server 102. Web browser 132 can be used to send HTTP requests to the web server 102 and view the returned HTML data. Web browser 132 can be a standard browser such as the Netscape Navigator or the Internet Explorer. Alternatively, the browser can be a specialized browser that is only used to display the data returned from web server 102. If a specialized browser is used, the data returned from the web server 102 does not have to be HTML, and the protocol does not have to be HTTP.

Figure 1B:
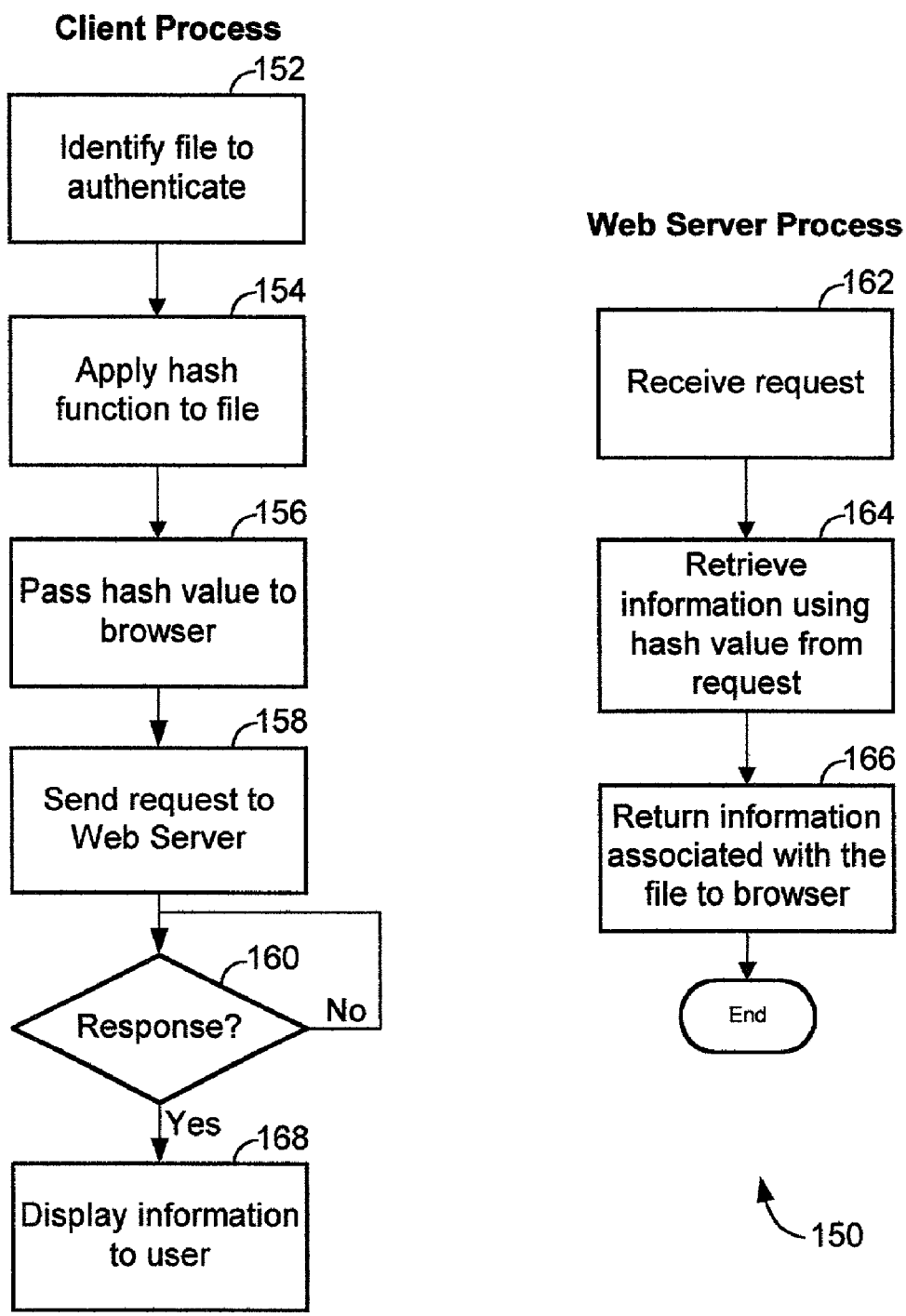
FIG. 1b shows a flow diagram of a process for authenticating a file.

Referring now to FIG. 1b, a method 150 for verifying the authenticity of a file is shown. The method includes a client user portion and a server portion. The method begins with the client user portion and the identification of a file to authenticate (152). The file may be received from the Internet or other source such as from another public distribution means, or may be resident on the user's computer. The hash function 131 is applied to the identified file to compute the hash of the file (154). The hash value is passed to the web browser 132 as part of an URL (universal resource locator) pointing to the web server 102 (156). The web browser 132 constructs and sends a request that contains the hash value to the web server 102 (158). Thereafter, the client portion waits for a response from the server portion (160).

The web server portion begins upon receipt of a request from a client (162). Web Server 102 retrieves information about the file according to the hash value from its database (information database 122)(164) and returns the information to the web browser 132 (166). The information returned can be of the form of an HTML page that includes authentication information associated with a given file that is retrieved from the information database.

Returning to the client portion, the web browser 132 receives the response from web server 102 and displays the information to the user (168). Thereafter, the process ends.

In one implementation, the client portion of the process can be automatically performed by a program installed on the end user computer 103. The user can alternatively run the program and specify a file as the input. A file can be selected for processing by simply clicking the file with the right mouse button and selecting a context menu named, for example, "View File Safety Info". The system can invoke hash function 131 to compute the hash of the file and launch web browser 132 to submit a page request to a URL that contains the hash value. For example, in a simple implementation, if the 128-bit hash value of a file is:

0123456789ABCDEF0123456789ABCDEF hexadecimal, then the URL can simply be:

http://www.filesafetycenter.com/0123456789ABCDEF0123456789ABCDEF.html.

In such a simple implementation, information about each file can be contained in one static html file and the web server 102 can be any standard web server and does not have to perform any special processing to service the request.

In an alternative implementation, a database is created to store the information related to the files and a CGI (common gateway interface) or a Servelet is used to serve the HTTP request. For example, the program at the end user computer 103 can launch the web browser 132 using the following URL: http://www.filesaftycenter.com/cgi-bin/hashcntr.cgi?HASH=<hash value in hex>. Web server 102 can be programmed so that when this URL is received, the web server will return a dynamically generated html page containing information about the file that has a hash value of <hash value in hex>.

The system discussed above allows an end user to retrieve from a central server the information about a file according to the hash of the file. Any type of information related to a file can be stored by the system in the information database. The information can be generated by the system or other third party systems. For example, the operator of web server 102 can compute the hash of the files and store the information about each file in a database record corresponding to the hash value of the file in the information database. The information can be obtained in many ways. For example, the author can submit the file and information to the web server operator. Alternatively, the operator can also act on his/her own to compute the hash of files already available from the Internet and then contact the author to verify their authenticity. In addition to a statement about the authenticity, the information associated with a file can also include results of virus scans, results of all the tests that are normally performed in virus research labs to discover new viruses, reports from other users, and some statistics that may help the users to determine the trustworthiness of the file. The statistics, for example, can include the number of users who have looked up the particular hash value and the number/location of different places the file has been distributed. In some cases the statistics alone may convince the user that the file is safe. For example, a file (and corresponding hash value) that has been accessed many times by different users from different places and does not include a warning in the information record may indicate that many people have used that file but no one has reported any problem. Accordingly, the file may be deemed to be pretty safe.

FIG. 2 shows several examples of the types of file safety information displayed in the web browser 132. Example A is displayed for an authentic file. Example B is displayed when the file has not been studied by the server operator. Example C is displayed if the file is known to be malicious.

Various enhancements to the system are possible. For example, the html data can be signed by a digital signature of the web server 102 and can be verified by the web browser 132 using the public key of the web server 102. This ensures that the data returned from the server is authentic.

The system can also take advantage of a digital signature to add more safety. For example, the server operator can verify the signature of a signed file and put a note on the information record telling the users that the file is signed by a particular signature belonging to a particular author. In this way, a user who does not have a signature verification utility can still get the same level of protection by simply computing a hash value and looking up the authenticity information record.

While this invention has been described in terms of several preferred implementations, it is contemplated that alterations, modifications and permutations thereof will become apparent to those skilled in the art upon a reading of the specification and study of the drawings. For example, the end user program can be combined with a download utility, such as an FTP client. In this way, a file downloaded from the Internet can be automatically verified without any user action.

Furthermore, certain terminology has been used for the purposes of descriptive clarity, and should not be construed to limit the invention. It is therefore intended that the following appended claims include all such alterations, modifications and permutations as fall within the true spirit and scope of the present invention.

What is claimed is:

1. A system to enhance safety of computer file distribution comprising:
   (1) a server computer connected to a computer network;
   (2) one or more electronic records stored in said server computer wherein each record:
      (a) contains information about a particular file, and
      (b) can be retrieved as a web page when a URL containing a hash value computed from said particular file using a one-way hash function is presented to said server computer; and
   (3) at least one user terminal also coupled to the computer network, the user terminal operable to compute the hash value of the particular file using said one-way hash function, and then use a URL containing the hash value to retrieve from said server computer, in a single authentication communication with said server computer, a web page that contains information about the file.

2. A system to enhance safety of computer file distribution comprising:
   (1) a server computer connected to a computer network;
   (2) one or more electronic records stored in said server computer, wherein each record includes information about a particular file and is indexed by a hash value computed from the particular file; and
   (3) at least one user terminal connected to the computer network, the user terminal operable to verify the authenticity of a particular file, including
      (a) computing the hash value of the particular file; and
      (b) retrieving from the server computer a web page that contains information about the particular file, in a single authentication communication with said server computer, including submitting a URL containing the computed hash to the server computer.

3. The system of claim 2 wherein the server computer is operable to hash using a one-way hashing function the particular file and store the hash value in the associated record.

4. The system of claim 2 wherein the web page includes a signature produced by an authenticating agent associated with the particular file and wherein the step of retrieving the web page includes retrieving the signature.

5. The system of claim 4 wherein the authenticating agent is the author of the particular file.

6. The system of claim 2 wherein the web page includes signature data produced when validating a signature associated with the particular file and wherein the step of retrieving the web page includes retrieving the signature data.

7. The system of claim 2 wherein the particular file is a computer program.

8. The system of claim 2 wherein the particular file is a data file.

9. A system to enhance safety of computer file distribution over a computer network comprising:
- a server computer connected to a computer network and accessible by computer network clients, the server computer including
- one or more electronic records wherein each electronic record includes information about a particular file and is indexed by a hash value computed from the particular file; and
- means for responding to client requests for information concerning a first file, in a single authentication communication with said server computer, the client requests including a URL containing a hash value computed from the first file, the means for responding operable to retrieve an appropriate electronic record associated with the first file and forward the information as a web page to a requesting client computer.

10. A system to enhance safety of computer file distribution over a computer network comprising:
- at least one user terminal connected to a computer network, the user terminal operable to verify the authenticity of a particular file, including
- (a) computing the hash value of the particular file; and
- (b) retrieving from a server computer a web page that contains information about the particular file, in a single authentication communication with said server computer, including submitting a URL containing the computed hash to the server computer.

11. The system of claim 10 wherein the user terminal is operable to display the information to the user terminal operator.

12. A method for enhancing safety of computer file distribution comprising:
- (1) storing one or more electronic records in a server computer wherein each electronic records includes information about a particular file and is indexed by a hash value computed from the particular file;
- (2) identifying a first file for authentication;
- (3) computing the hash value of the first file; and
- (4) retrieving from the server computer a web page that contains information about the first file, in a singe authentication communication with said server computer, including submitting a URL containing the computed hash to the server computer.

13. A system, comprising:
- a server computer to store one or more electronic records each containing information associated with one particular file and index the electronic records according to hash values computed from the associated files; and
- a terminal to receive an electronic record associated with a file and make a single authentication communication with the server computer, including computing a hash value from the file and retrieving an electronic record associated with the file based on the hash value.

14. A system of claim 13 wherein the hash value is sent to the server computer in a web request.

15. A system of claim 14 wherein the hash value is embedded in a URL of the web request.

16. A system of claim 13 wherein the electronic record contains safety information about the associated file.

* * * * *